May 10, 1955 — F. E. O'NEILL — 2,708,132
CONNECTOR FOR OIL TOOLS
Filed March 17, 1952

INVENTOR,
FRANK E. O'NEILL
BY
Mellin and Hanscom
ATTORNEYS

United States Patent Office 2,708,132
Patented May 10, 1955

2,708,132

CONNECTOR FOR OIL TOOLS

Frank E. O'Neill, Glendale, Calif., assignor to Johnston Testers, Inc., Houston, Tex., a corporation of Delaware Application March 17, 1952, Serial No. 276,947

2 Claims. (Cl. 287—125)

This invention relates to a connector for oil well tools.

In many oil well tools, such as for instance, hydraulic well jars, it is necessary to use heat-treated steel tubular body members which are threadedly connected to one another. It is important that the tubular members be locked against unthreading movement relative to one another by means other than the threaded joint. If the heat-treated tubular members are welded at the threaded joint, the tubular members in the vicinity of the place of welding lose some or all of that portion of their strength created by the heat-treating operation.

It is a main object of the present invention to provide a connector for oil well tools by which two heat-treated steel tubular members, threadedly connected to one another, can be locked against unthreading movement without impairing the strength of the tubular members.

More specifically, it is an object of the present invention to provide a connector for a pair of heat-treated tubular steel body members, comprising a pair of bands respectively non-rotatably engaging the tubular members and which bands are welded to one another thereby providing a non-rotative connection between the tubular members.

Various other objects of the present invention will be apparent from the following description taken in connection with the accompanying drawings, wherein.

Figure 1:
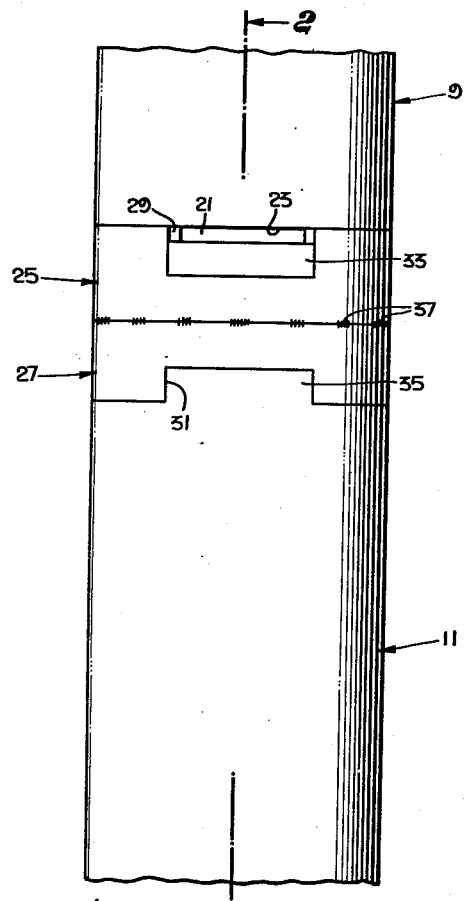
Fig. 1 is a view in side elevation of a pair of heat-treated tubular members having the connector of the present invention applied thereto and connecting the members to one another.

Referring to the accompanying drawings wherein similar reference characters designate similar parts throughout, there is disclosed, fragmentarily, an oil well tool having a pair of heat-treated tubular body members 9 and 11. Member 9 has a threaded pin 13 formed thereon threadedly engaging a threaded box 15 formed in the upper end of tubular member 11. Between members 9 and 11, there is a suitable O ring seal 19 shown in Fig. 2 for preventing leakage of fluid out through the threaded joints. In the specific illustration shown in the drawings, the oil well tool fragmentarily disclosed is a hydraulic well jar and there is provided a member 17 which is one of the jar members. The invention is, however, not intended to be limited to a hydraulic well jar and is obviously applicable to other oil well tools.

Pin 13 has formed thereon an unthreaded cylindrical portion 21 terminating at a shoulder 23 formed on tubular member 9. On cylindrical portion 21 are disposed a pair of bands 25 and 27. These bands will normally be formed from relatively inexpensive steel, such as cold-rolled steel, but any kind of steel can obviously be used.

Figure 2:
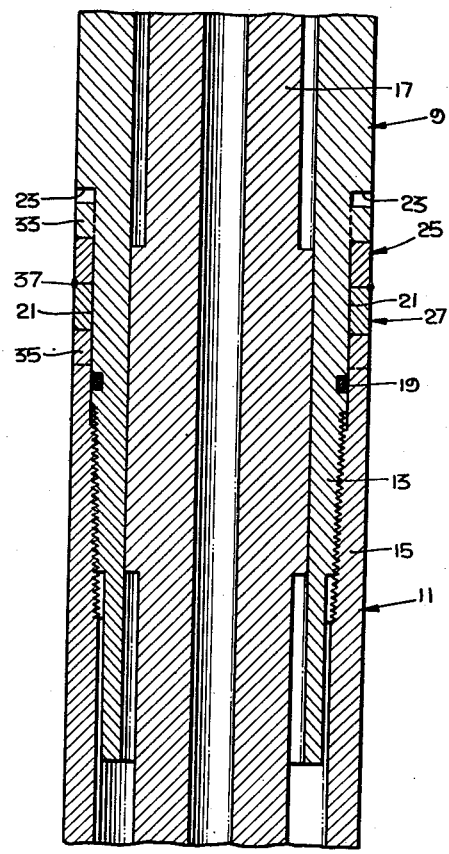
Fig. 2 is a longitudinal mid-section taken along line 2—2 of Fig. 1.
Figure 3:
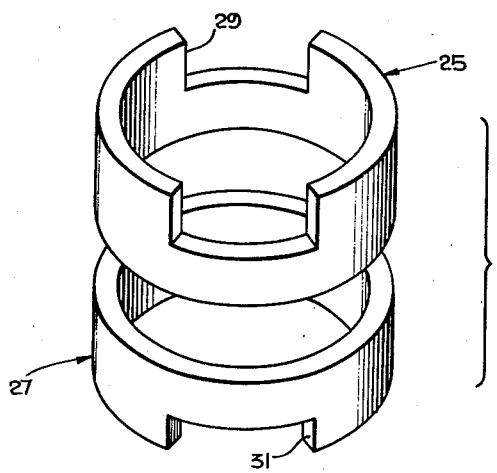
Fig. 3 is a perspective view of the pair of bands prior to their being welded to one another.

Each of the bands is formed with a pair of slots or notches 29 and 31, respectively, as clearly shown in Fig. 3, for engagement with lugs 33 and 35 formed on tubular members 9 and 11, respectively, providing non-rotatable engagement between bands 25 and 27 and tubular members 9 and 11. The contiguous portions of bands 25 and 27 are spot or tack-welded to one another at 37 as shown in Figs. 1 and 2.

The manner of connecting members 9 and 11 is as follows: Tubular bands 25 and 27 are arranged on the cylindrical portion of pin 13, and the tubular members 9 and 11 are threaded one onto the other. During the threading engagement, the slots or notches 29 and 31 are arranged in alignment with the lugs 33 and 35, respectively, on the tubular members so that the lugs slide into the slots during the latter part of the threading movement. At this point, bands 25 and 27 are spot-welded to one another at 37 thereby locking the tubular members 9 and 11 against unthreading movement. The spot or tack-welding operation is performed so quickly that only a very small amount of heat is generated so that the strength of tubular members 9 and 11 are not substantially adversely affected.

When it is desired to separate members 9 and 11, the weld 37 can be broken and members 9 and 11 unthreaded. The bands can be used again, if desired, or a new pair of bands can be utilized, since the cost of the bands is exceedingly small in comparison of the overall cost of the tool.

By the present invention a novel connector has been provided for connecting two heat-treated tubular steel body members together to lock the members against unthreading movement, without impairing the strength of the tubular members.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. In combination, a pair of heat-treated tubular metal members threadedly connected to one another, means for locking said members against unthreading movement comprising a pair of cylindrical bands having abutting end surfaces, each of said bands being interengaged with one of said members but not physically bonded thereto, whereby relative rotation between each of said bands and its respective member is prevented while maintaining heat transfer therebetween at a minimum, and welding between said bands at the joint between their abutting surfaces.

2. The combination set forth in claim 1, wherein the interengaging connections between said bands and said members each comprises a lug on the member received within a slot on the band.

References Cited in the file of this patent

UNITED STATES PATENTS

| | | |
|---|---|---|
| 1,433,860 | Spencer | Oct. 31, 1922 |
| 2,031,754 | Bacigalupi | Feb. 25, 1936 |
| 2,073,093 | Brantly | Mar. 9, 1937 |
| 2,142,494 | Cartwright | Jan. 3, 1939 |
| 2,232,135 | Pate | Feb. 18, 1941 |
| 2,301,495 | Abegg | Nov. 10, 1942 |
| 2,421,945 | Hunt | June 10, 1947 |

FOREIGN PATENTS

| | | |
|---|---|---|
| 25,117 | Great Britain | of 1910 |